July 17, 1962   J. R. HARKNESS   3,044,239
ROTARY POWER LAWN MOWER WITH IMPROVED ENGINE
Filed Sept. 9, 1960   9 Sheets-Sheet 1
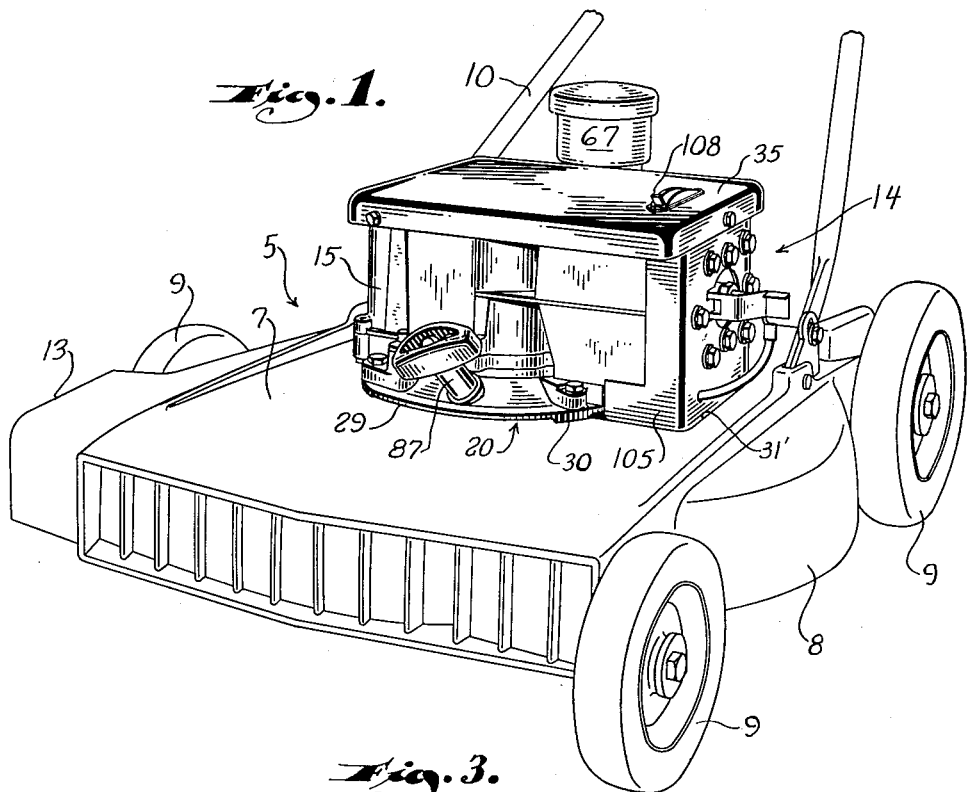
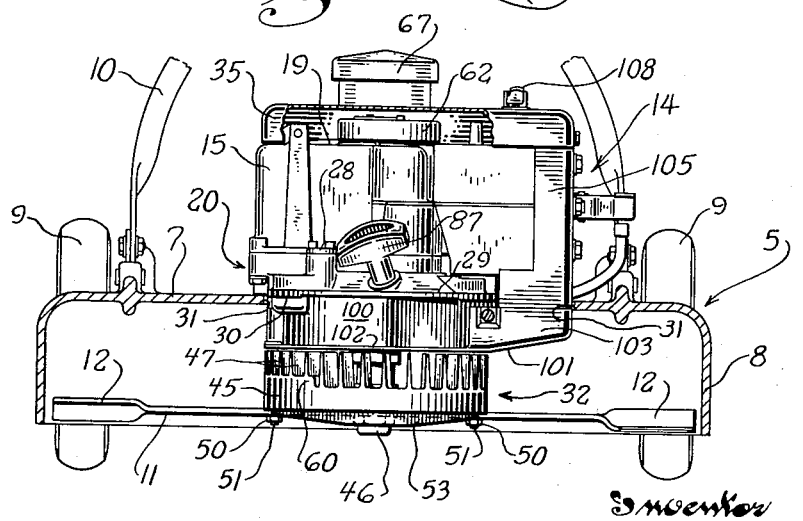
Inventor
Joseph R. Harkness

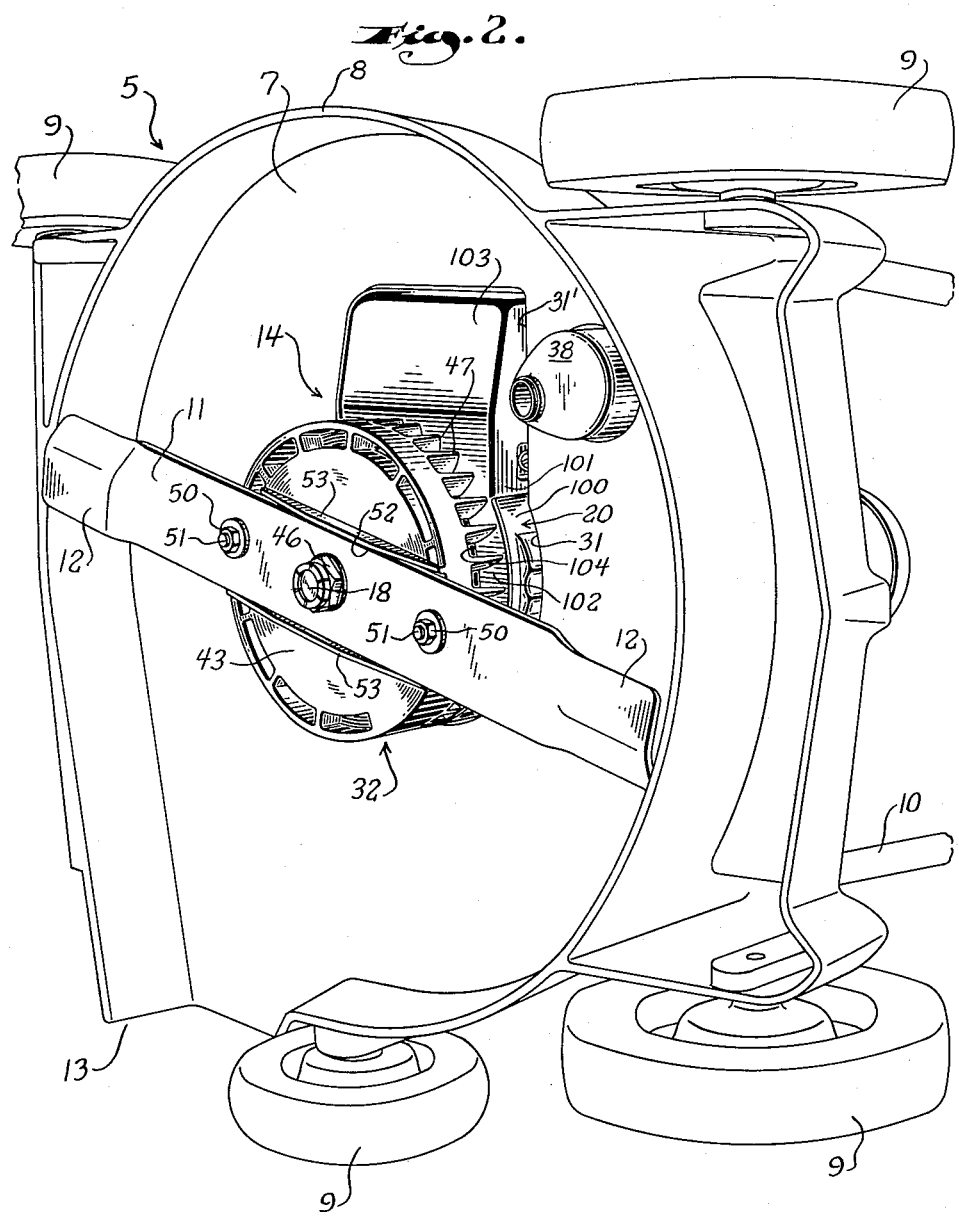

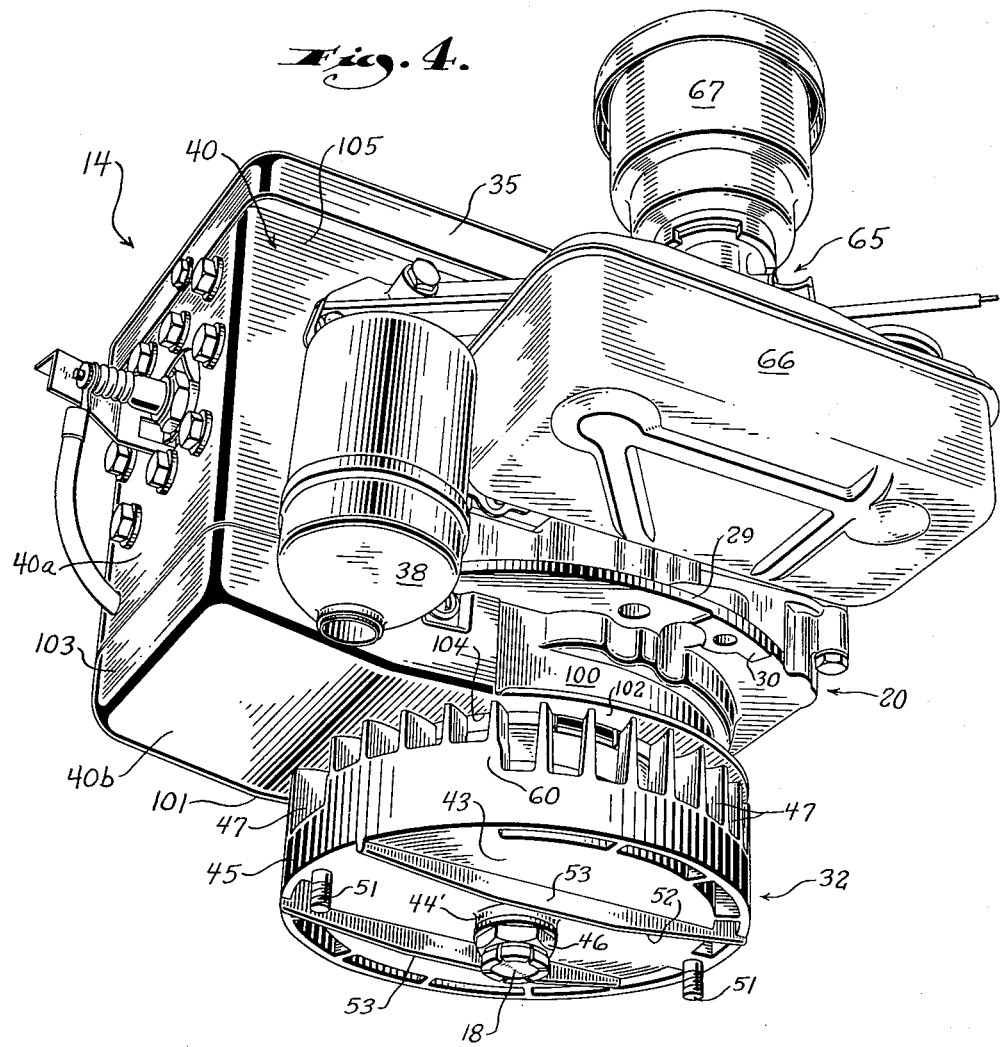

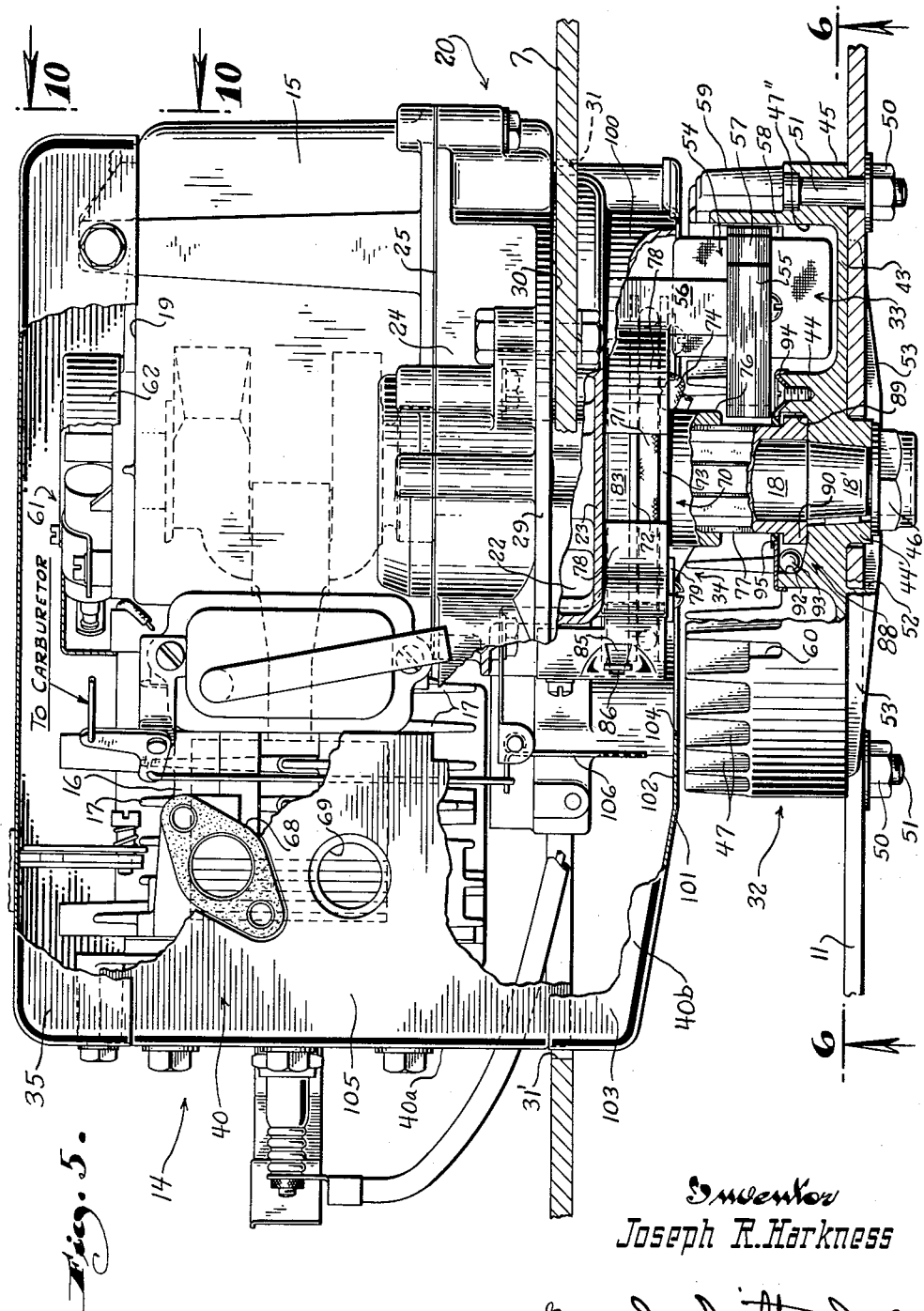

July 17, 1962  J. R. HARKNESS  3,044,239
ROTARY POWER LAWN MOWER WITH IMPROVED ENGINE
Filed Sept. 9, 1960  9 Sheets-Sheet 5

Inventor
Joseph R. Harkness
By Ira Milton Jones
Attorney

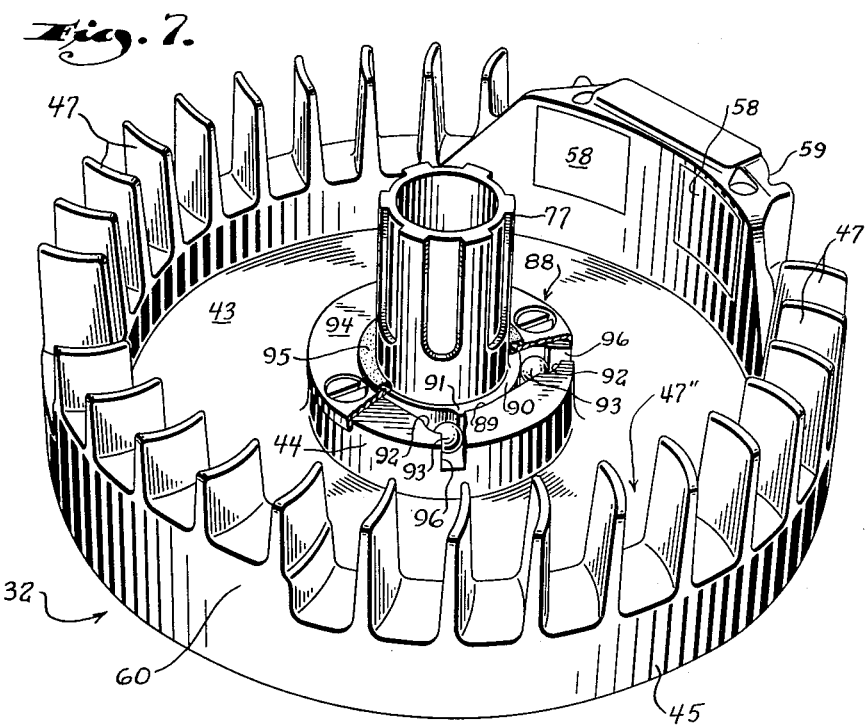
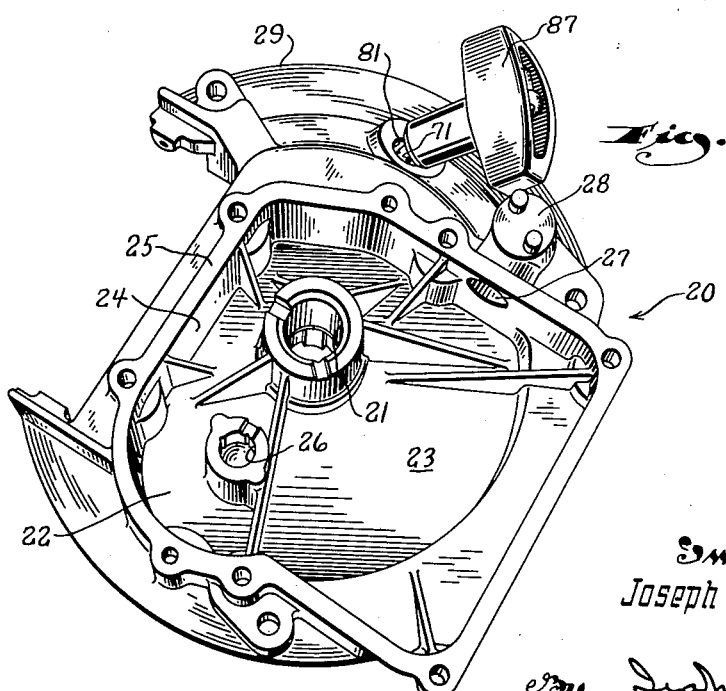

July 17, 1962 J. R. HARKNESS 3,044,239
ROTARY POWER LAWN MOWER WITH IMPROVED ENGINE
Filed Sept. 9, 1960 9 Sheets-Sheet 7

Inventor
Joseph R. Harkness

By
Attorney

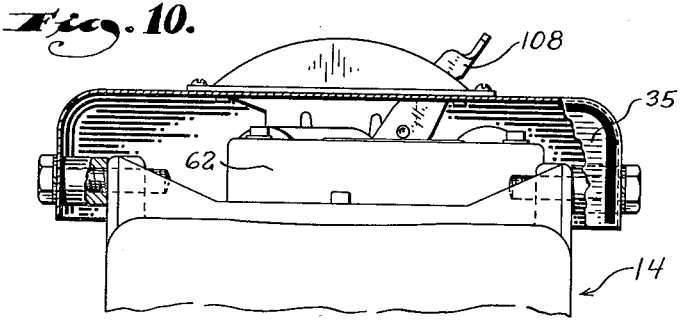
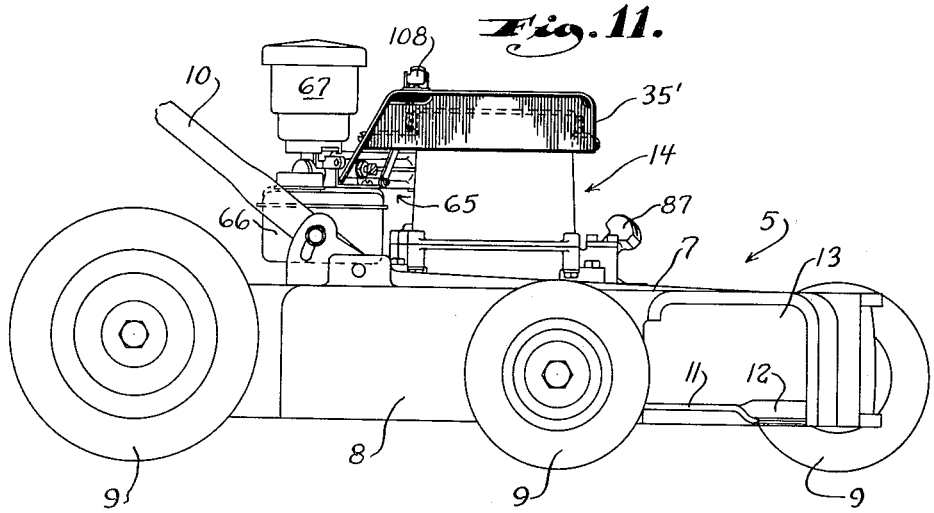
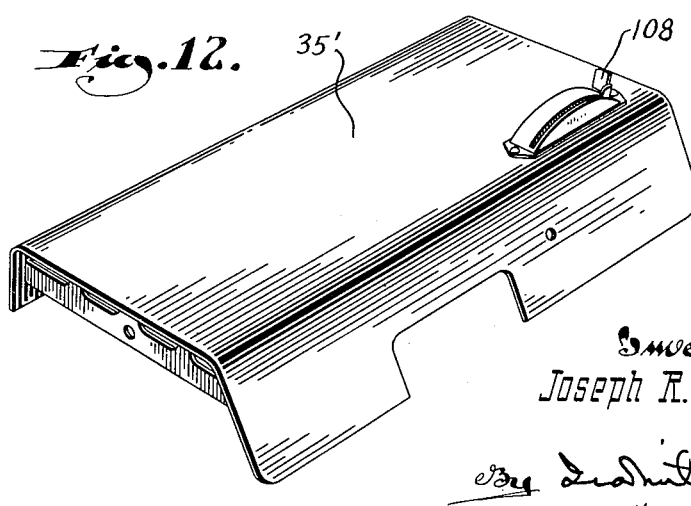

July 17, 1962 J. R. HARKNESS 3,044,239
ROTARY POWER LAWN MOWER WITH IMPROVED ENGINE
Filed Sept. 9, 1960 9 Sheets-Sheet 9
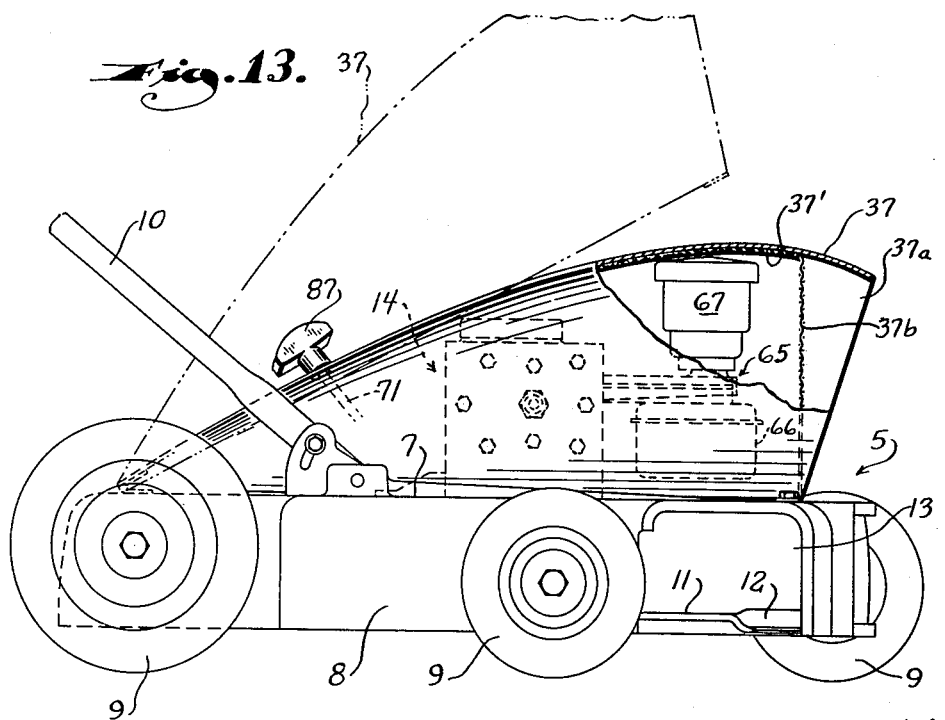
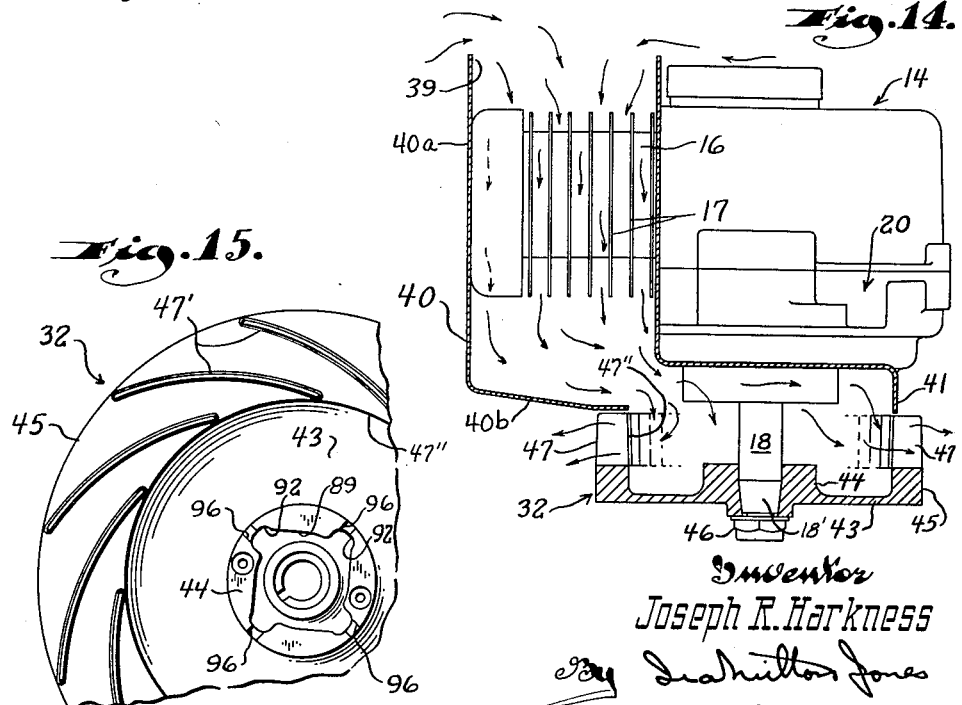
Inventor
Joseph R. Harkness

United States Patent Office 3,044,239
Patented July 17, 1962

3,044,239
ROTARY POWER LAWN MOWER WITH IMPROVED ENGINE
Joseph R. Harkness, Milwaukee, Wis., assignor to Briggs & Stratton Corporation, Milwaukee, Wis., a corporation of Delaware
Filed Sept. 9, 1960, Ser. No. 55,010
10 Claims. (Cl. 56—25.4)

This invention relates to power lawn mowers of the rotary type in which a cutter blade revolves about a vertical axis, and more particularly to an improvement in such lawn mowers gained by a new and novel cooperative relationship between the lawn mower and its engine, which in itself has several new and improved features.

It should be understood, however, that while the engine of this invention is exceptionally well adapted for use on lawn mowers, and particularly rotary lawn mowers, it is by no means a single purpose engine. On the contrary, the novel features of the engine, and especially the way in which it is cooled, make it an ideal power plant for many purposes. To mention a few, riding-type tractors for various garden implements; the implements themselves; motor cars and scooters; generator sets; pumps; and practically any machine intended to be driven by an internal combustion engine.

Heretofore, it has been customary in rotary lawn mowers powered by internal combustion engines, for the engine to have its flywheel and air impeller, which usually were combined in a single unit, as well as its magneto and its starter mechanism mounted at the top of the engine. This obviously handicapped the equipment designer, since the top of the engine always had to be left clear and unobstructed.

With a view to eliminating this handicap, this invention has as its purpose a new way of operatively associating the engine with the lawn mower which does not hamper the designer in his choice of styling or design treatment for the mower, but instead enables him to place practically any desired covering over or on the engine, to thereby blend the engine into the overall mower design.

To achieve this result, the invention so modifies the design or structural organization and construction of the engine and its disposition on the mower chassis that the fly-wheel impeller unit of the engine, its magneto and the starter mechanism are all contiguously associated on the power take-off end portion of the engine crankshaft below the engine mounting flange, and hence below the mower deck, with the inlet of the air impeller facing upwardly and directly adjacent to the discharge end of an air guiding duct defined by structure on the engine, which duct passes through the mounting flange and contains the hot engine parts.

The advantages of this arrangement are many, and perhaps chief among them is the fact that recirculation of cooling air is virtually impossible because of the remoteness of the inlet and outlet ends of the air guiding duct, and the baffling effect of the mower deck on which the engine is mounted.

Another advantage of this new orientation of the engine parts with respect to its mounting flange by which the engine is mounted on the mower deck, is that it places a considerable portion of the engine, namely, the flywheel-impeller unit, the magneto and the starter mechanism in otherwise wasted space between the deck and the cutter blade unit, and thereby reduces the overall height of that portion of the engine above the deck.

Another very important advantage achieved by this new arrangement is increased stability for the mower against being tipped over during starting, since by having the starter mechanism located below the deck, the point at which a pull is applied to the engine through the rope is much closer to the bottom of the entire weight structure.

Because the air guiding duct of the cooling system of the engine has its inlet at the top of the engine, above the mower deck, and its outlet below the mower deck when the engine is used to drive a rotary lawn mower, the equipment designer may cover the engine in any way he might choose in order to achieve a desired effect, as long as free flow of fresh air to the inlet of the duct is provided for. Hence, the engine proper, that is, the cylinder and crankcase, and all those engine parts carried thereby, may be enclosed within a housing of any kind, size or shape without in anywise affecting the operation of the engine or reducing its power output, as long as the housing has an air inlet opening large enough to permit free flow of fresh air into the housing and to the inlet of the air guiding duct.

Another very important object of this invention is to provide a quiet internal combustion engine driven lawn mower. Needless to say, the noise produced by a conventional engine driven lawn mower in operation always has been a nuisance, heretofore generally, though reluctantly, accepted as inevitable. While mufflers for the engine were improved and the engine exhaust sometimes was directed downwardly into the space below the mower deck, there was no really effective way of quieting a power lawn mower because of the way the engines were designed. This invention goes a long way toward solving this noise problem.

The attainment of this objective is made possible by the fact that the engine cooling system of this invention, and particularly the air guiding duct which encloses the hot engine parts and feeds the air flowing therethrough only to the inlet of the impeller below the mower deck, makes it possible, for the first time, to enclose the engine in a sound deadening or silencing housing, of which the mower deck may form the bottom.

The enclosure of the engine in a housing enables the invention to achieve still another advantage. The air admission port with which the housing must be provided in order for outside air to reach the intake of the air guiding duct, provides an excellent place at which to control the influx of cooling air, that is, to screen grass clippings and other debris from such air. Because there is no necessity for limiting the size of the air admission port, it can be as large as needed to assure low velocity of air flow therethrough. Accordingly, there is small likelihood that the screen which is placed across the air admission port will ever become clogged.

By contrast, in prior engines in which a fan drew air into a shroud and discharged it against the hot engine parts, the velocity of the air flow at the first point where it could be screened, namely, the inlet to the fan or blower was relatively high. This high velocity tended to induct grass clippings and other debris and, to minimize the entry thereof into the engine cooling system, the screen of such prior engines was generally arranged to rotate with the crankshaft. With this invention no such rotating screen is needed. Any simple vertical stationary screen across the air admission port of the housing or hood is sufficient, and as will be readily understood, a large stationary screen presents no noise problem and has the advantage of easy cleaning, and freedom of styling.

It is recognized that efforts have been made in the past to attain some of the objectives of this invention, but as far as is known, none have resulted in a commercially practicable construction. Illustrative of these prior efforts are the patents to E. C. Kiekhaefer, No. 2,791,078, and G. W. Daggett, No. 2,557,598.

The Kiekhaefer patent discloses a rotary lawn mower driven by a two-cycle engine mounted with its starter mechanism uppermost and to have its exhaust discharge below the mower deck. Its cutting element is provided by a large diameter disc which serves as the engine flywheel, and short blades fixed to the periphery of the disc serve as the cutters per se. The disc also provides a large axial flow fan and, for that purpose, has radial blades struck therefrom. The fan blades sweep past the mouth of the engine exhaust port and also past the discharge end of a shroud placed over the engine cylinder, but only in a small fraction of their orbit. While it may appear upon the surface that the structure disclosed in the Kiekhaefer patent might meet some of the objectives of this invention, upon deeper analysis it is plain that it can not. With the fan arranged as it is nearly its entire inlet is open to the space below the mower deck, so that air flowing into the top or inlet of the fan will be largely, and perhaps even exclusively, that which reaches the fan as the result of toroidal air flow around the entire peripheral portion of the fan. This condition could conceivably resist rather than create a down draft through the shroud. In any event, it is plain that the patented structure would be very inefficient as a means for moving cooling air through the engine. The power consumption of the fan would be intolerably high.

It is doubtful, therefore, that the structure of the Kiekhaefer patent will perform in the manner contended by the patentee. In any event, it is clear that its disclosure lacks many of the essential features of this invention. To mention a few, it does not have the inlet of its air impeller communicated exclusively with the discharge end of an air guiding duct to receive air only therefrom; it does not have the starter mechanism below the mower deck; it does not have a centrifugal-type impeller; its unmuffled two-cycle engine cannot operate without producing an excessive amount of noise; and, most important, it does not teach the present invention.

The Daggett patent is equally lacking in pertinence. At the outset, it is significant that this patent is exclusively directed to a special form of cutter having blades provided by lengths of wire. It is in nowise concerned with the engine or the combination of the engine with the mower. In fact, the engine in this patent is only diagrammatically illustrated. The starter is likewise diagrammatically depicted, but as part of the mower rather than of the engine, and, in addition, it is located at the very top of the entire structure. Moreover, Daggett did not even bother to illustrate either a magneto for his engine, or any means of conducting exhaust gases from the engine. Of greater significance, however, there is no structure on his engine defining an air guiding duct to assure flow of cooling air over the hot parts of the engine in good heat exchange relation therewith. These points support the inescapable conclusion that the patentees had no conception of the present invention.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention, constructed according to the best mode so far devised for the practical application of the principles thereof, and in which:

FIGURE 1 is a perspective view of a power lawn mower constructed in accordance with this invention;

FIGURE 2 is a perspective view of the lawn mower tipped over on its side to illustrate the bottom thereof;

FIGURE 3 is a cross sectional view through the mower taken on a plane substantially directly forward of its engine and showing how much of the engine is located "below deck";

FIGURE 4 is a perspective view of the engine per se, shown detached from the mower and viewing the same from the rear and bottom;

FIGURE 5 is a front view of the engine with parts broken away and in section, to better illustrate different structural features and showing the engine mounted on the deck of the mower chassis with the cutter blade attached;

FIGURE 7 is a perspective view of the combined flywheel and air impeller which constitutes an essential part of the engine, showing a part of the starter mechanism in place thereon;

FIGURE 8 is a perspective view of the top side of the casting which serves as the cover for the engine crankcase, an oil sump for the engine, a mounting flange for the engine, a cage for the rope starter mechanism, and other parts;

FIGURE 10 is a side view of the upper portion of the engine essentially taken on the plane of the line 10—10 in FIGURE 5, and with part of the engine hood broken away and in section;

FIGURE 11 is a side view of a lawn mower constructed in accordance with this invention, and illustrating a somewhat modified form of engine hood;

FIGURE 12 is a perspective view of the engine hood employed in the structure of FIGURE 11;

FIGURE 13 is a side view of a lawn mower equipped with a full hood or housing for the engine to achieve maximum noise silencing;

FIGURE 14 is a diagrammatic view of the engine of this invention, to better illustrate the manner in which the air impeller and the air guiding duct function to bring air across the hot portions of the engine; and FIGURE 15 is a top view of a portion of the combined flywheel and air impeller, to illustrate the preferred shape and disposition of the impeller vanes.

Figure 6:
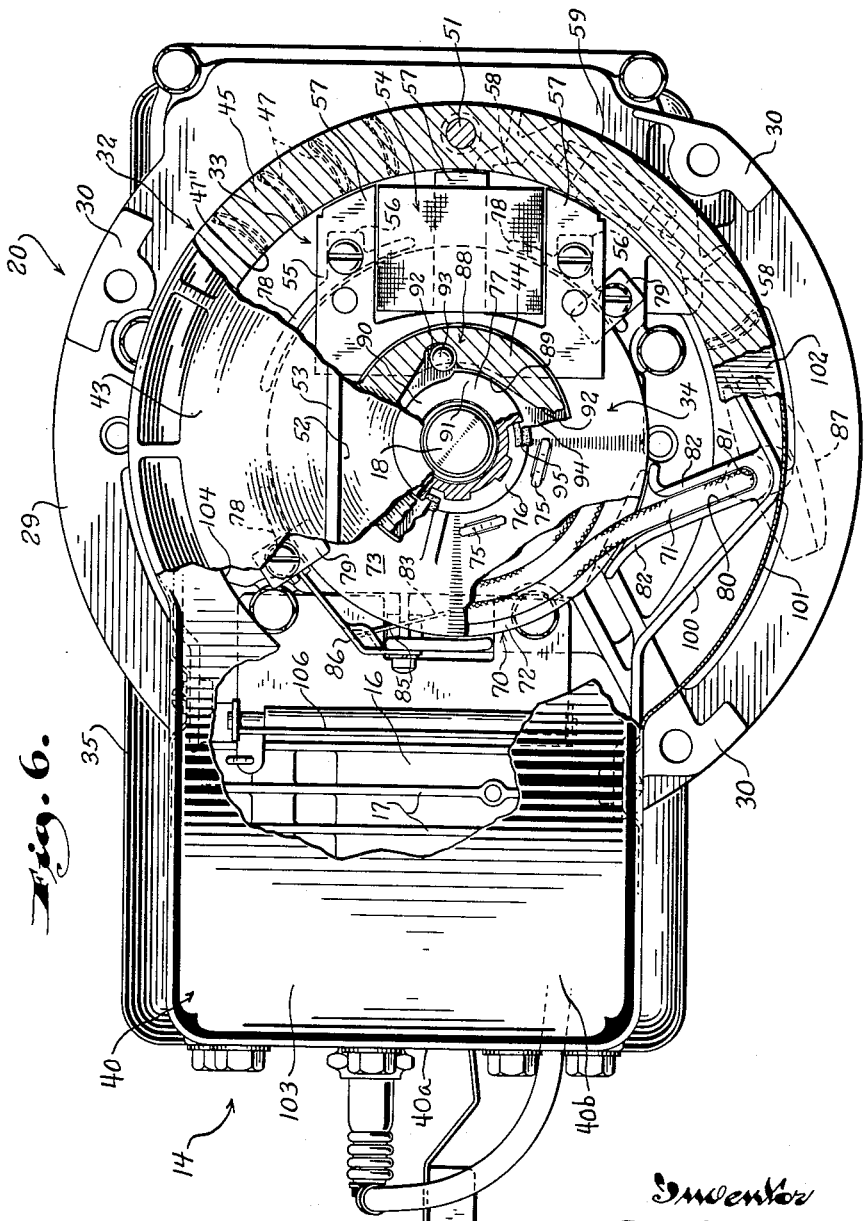
FIGURE 6 is a bottom view of the engine, taken essentially on the plane of the line 6—6 in FIGURE 5, but with parts broken away and in section.

Referring now more particularly to the accompanying drawings, in which like numerals indicate like parts throughout the several views, the numeral 5 designates generally the chassis of a power lawn mower of the rotary type constructed in accordance with this invention, and which, as is customary, comprises an inverted dish-shaped housing having a flat top wall providing a deck 7 and a depending skirt 8. Wheels 9 portably support the chassis and a handle 10, only part of which is shown, extends rearwardly from the chassis to enable the operator to control and move the mower over the ground.

The cutting of the grass is done by a blade 11 which revolves about a vertical axis, with the blade travelling in a horizontal plane spaced a definite distance below the underside of the chassis deck. The actual cutting portions 12 of the blade are at its outer extremities and, as is customary in mowers of this type, the chassis has a discharge opening 13 through its skirt at one side of the mower, through which the grass clippings are ejected.

The cutter blade is driven by an engine, indicated generally by the numeral 14, which is mounted on the chassis deck 7 with the power take-off end portion of its crankshaft projecting downwardly through the chassis to drive the cutter blade.

The structure thus far described, follows standard practice. The invention differs from this standard practice in a way which makes possible the attainment of some significant and important innovations in rotary lawn mowers, and to a large degree this attainment is made possible by a new and novel orientation of certain essential elements of the engine, and in the relationship or combination of this new engine with the existing structure of the lawn mower.

The engine of this invention, though essentially intended for operation with its crankshaft vertical, nevertheless has certain novel features which could also be adapted to engines designed to operate with the crankshaft horizontal.

Much of the basic engine is the same as that of the Lechtenberg Patent No. 2,693,789. Hence, it comprises a unitary cylinder crankcase casting 15, the cylinder portion 16 of which has heat radiating fins 17, and the crankcase portion of which provides all walls of the crankcase except one—namely, that wall of the crankcase through which the power take-off end 18' of the crankshaft 18 projects. Accordingly, considering the engine mounted with its crankshaft vertical, the cylinder crankcase casting 15 provides the top wall 19 of the crankcase in which the top crankshaft bearing (not shown) is located, the end and side walls of the crankcase, and the cylinder.

The bottom wall of the crankcase is provided by a cover casting, indicated generally by the numeral 20. This cover casting is removably secured to the cylinder-crankcase casting to close the open bottom thereof. It serves many purposes, as will be hereinafter described, including the provision of a bearing 21 in which the power take-off end portion 18' of the crankshaft is journalled. It also provides an oil sump 22 having a bottom wall 23 and a side wall 24 which terminates in a finished surface 25 adapted to mate with and be clamped against a correspondingly shaped finished surface on the cylinder crankcase casting with a gasket interposed therebetween.

The bearing 21 is formed in a boss which rises from the bottom wall 23 of the sump to an elevation above the normal oil level in the sump; and, in the same fashion, a bearing 26 is formed in a boss projecting from the bottom wall 23 to mount the adjacent end of the cam shaft (not shown). Oil is supplied to the sump through a filler port 27, which is normally closed by a removable plug 28.

A mounting flange 29 formed as an integral part of the cover casting 20 projects laterally therefrom. On the underside of this flange are three pads 30 which have downwardly facing surfaces lying in a common plane normal to the crankshaft axis. These pads seat upon and are bolted to the chassis deck, and thus mount the engine firmly thereon with approximately one-half of the cover casting 20 and, of course, all of the rest of the engine, located above the chassis deck and with the other lower half of the cover casting and the downwardly projecting power take-off end portion 18' of the crankshaft below the chassis deck.

To enable the engine to be mounted in this fashion, the chassis deck has a hole 31 substantially in its medial portion, large enough to permit all those portions of the engine which lie beneath the plane of the mounting pads 30 to pass therethrough.

Since a rather substantial distance (on the order of three inches) should be maintained between the underside of the mower deck and the cutter blade for the mower to operate efficiently, and since engines heretofore used to power lawn mowers had no part thereof, other than the crankshaft, located between the cutter blade and the bottom crankshaft bearing which seldom projected very far below the mounting flange, a considerable portion of the total length of the crankshaft was devoted solely to spanning this distance between the deck and the cutter blade. Accordingly, the overall height of the engine, and particularly the height thereof above the mower chassis deck, was greater than would be the case if essential parts of the engine could be located in this space below the deck. Merely raising the location of the mounting flange is out of the question, since it is already as close to the engine cylinder as possible.

The present invention accomplishes the desired result by the unprecedented placement of the combined flywheel and air impeller 32, the magneto designated generally by the numeral 33 and the starter mechanism, designated generally by the numeral 34, at the power take-off side of the engine and, hence, in the heretofore wasted space below the deck of the mower chassis.

However, important as this space saving feature of the invention may be, the described placement of the combined flywheel and air impeller, the magneto and the starter mechanism, has a much more significant and important consequence. Because these necessary elements of the engine are all located at that side of the engine which faces downwardly in the use of the engine on a rotary lawnmower, there is nothing at the top side of the engine to hinder the designer in applying whatever design treatment may be chosen to either blend the engine into the design of the mower or completely cover the engine.

Thus, for instance, any simple cover such as that indicated by the numeral 35, and shown particularly in FIGURES 1, 3, 5 and 10, or the variation thereof indicated by the numeral 35' in FIGURES 11 and 12, could be used to cover the top of the engine; or the entire engine, i.e. all that portion thereof located above the chassis deck may be covered by a hood 37, as shown in FIGURE 13.

Fully covering the engine in this manner makes it possible to effectively silence the engine by the simple expedient of lining the underside of the hood 37 with a sound absorbing material 37', and having the engine exhaust muffler 38 positioned to discharge downwardly into the space below the mower chassis deck.

Whichever cover scheme is employed, from the standpoint of engine operation, the only prerequisite is that the cover or hood be so designed and mounted as to permit an unrestricted low velocity flow of air to the upwardly opening inlet 39 of an air directing duct 40. The duct 40 passes through the mounting flange 29, being accommodated by a cutout or recess 29' in the flange (see FIGURE 8) and through a lateral extension 31' of the hole 31 in the deck, and as perhaps most clearly seen in the diagrammatic showing of FIGURE 14, the duct has a vertical upper section 40a in which the finned engine cylinder 16 is disposed, and a substantially horizontal lower section 40b, these sections being joined at the level of the mower deck. From its junction with the upper section the horizontal lower section extends laterally directly below the mower deck, toward and around the downwardly projecting end portion 18' of the crankshaft. The bottom of the lower section has a round discharge mouth concentric to the crankshaft and opening downwardly into the inlet of the air impeller which is located directly below the mouth of the duct. Hence, all air entering the impeller must first flow through the duct.

Where a simple cover such as those shown in FIGURES 10 and 11 is used, it is only necessary to leave adequate space between the edge of the cover and the adjacent walls of the engine, for the air to flow unrestrictedly to the inlet of the duct 40; but where a hood is used, as shown in FIGURE 13, the hood must have a relatively large air inlet port 37a. In each instance it is preferably to provide a screen across the air inlet, as at 37b in FIGURE 13.

The air impeller, as is customary, is an integral part of the flywheel, hence, these parts—as already indicated—are herein identified as a combined flywheel and air impeller, designated generally by the numeral 32. In its preferred embodiment, the air impeller is of the centrifugal type, wherein the air is taken in axially and discharged radially. Accordingly, the flywheel portion of the unit has an imperforate web 43 connecting its hub 44 with its rim 45, the hub being keyed to the lowermost portion of the power take-off end 18' of the crankshaft to which it is held by a nut 46.

The outer or lower face of the flywheel preferably is planar except for a short downwardly projecting hub portion 44', against which the clamping nut 46 bears. The main part of the hub and the rim of the flywheel project from the opposite face of the web toward the adjacent wall of the engine.

The air impeller, being of the centrifugal type, consists of vanes 47 formed integrally with the rim 45 and projecting axially from the extremity thereof toward the adjacent wall of the engine, or, in other words, upwardly, and although the vanes 47 actually project from the rim 45, as shown and described, in a broad sense they may be considered as projecting from the web 43.

The vanes 47 may have the shape in which they are shown in most of the figures of the drawings, but the curved circumferentially overlapping shape and disposition thereof shown in FIGURE 15, where they are identified by the numeral 47', is preferable. This shape and disposition of the vanes not only has the advantage of greater aerodynamic effectiveness, but, in addition, it enables the combined flywheel and air impeller to provide a more effective shield for the armature of the magneto, as will be hereinafter more fully described.

As best shown in the diagrammatic illustration of FIGURE 14, the vaned rim of the combined flywheel and air impeller has its inner edge directly adjacent to the edge of the discharge mouth of the air directing duct 40, so that the only outlet for the air moving downwardly through the duct is through the spaces between the impeller vanes.

Hence, all air moved by the air impeller is fed thereto by the air directing duct; or, stated in another way, all the air flowing down through the air directing duct enters the inlet 47'' of the air impeller and is discharged thereby into a zone remote from the inlet to the duct. This is an important and significant point, since it assures optimum efficiency for the cooling system of the engine by constraining the air to flow across the hot parts of the engine, in good heat exchange relation therewith, and discharging the heated air in a way which makes recirculation thereof a virtual impossibility.

By virtue of this engine cooling system, it is possible to enclose the engine within a compartment having sound insulating walls and completely closed except for an air inlet port in one wall thereof through which fresh air enters the compartment for passage through the duct, and an opening in another wall remote from the air inlet port through which the crankshaft projects to mount the air impeller, and through which the discharge end of the duct and the inlet of the air impeller connect. In a rotary lawn mower installation, one wall of the enclosing compartment can be the deck of the mower chassis and the remaining walls can be provided by a hood of any desired shape, as shown for instance in FIGURE 13.

The cutter element 11, as already indicated, is secured directly to the underside of the combined flywheel and air impeller. It extends diametrically across the bottom of this unit and is held in place thereon by clamping nuts 50 threaded onto studs 51 which project downwardly from the lower face of the flywheel and pass through appropriately located holes in the cutter blade. At its center, the cutter blade has a hole to accommodate the downward projection 44' of the hub.

Although the reception of the studs 51 in the holes in the blade, of itself, could transmit the torque from the flywheel to the cutter blade, in the disclosed embodiment of the invention the blade is received in a channel 52 which extends diametrically across the underside of the flywheel. The web or bottom of this channel is formed by the underside of the flywheel, and its flanges are formed by parallel ribs 53 which extend down from the underside of the flywheel and are equispaced from the axis of rotation. Hence, by having the blade fit fairly snugly between the ribs 53, the studs are relieved of torque transmitting forces, and since the ribs extend entirely across the flywheel an exceptionally strong connection is obtained.

It should be observed that, by having the cutter element or blade mounted directly on the combined flywheel and air impeller, a separate coupling between the cutter blade and the engine crankshaft, such as that usually required in rotary lawn mowers heretofore available, is entirely eliminated. It is also appropriate at this point to note that the new orientation of the combined flywheel and air impeller, together with the fact that the cutter blade is mounted directly thereon, greatly reduces the torque stresses on the crankshaft, by carrying stresses resulting from the collision of the blade with any solid object, directly into the flywheel.

The magneto, indicated generally by the numeral 33, is of conventional design and construction, except for the location of its magnetic parts, and particularly its armature 54.

As best shown in FIGURES 5 and 6, the magneto armature 54 is located in the cup-shaped housing formed by the combined flywheel and air impeller, the bottom of which housing is the web of the flywheel, and the side wall of which is its vaned rim. The armature is mounted in this location by having its magnetic core or frame 55 secured to a pair of bosses or lugs 56 which project down from the engine crankcase cover casting 20 (see FIGURE 9). The poles 57 of the armature core face outwardly toward the vaned rim of the flywheel to be swept by the poles 58 of the rotating magnetic parts of the magneto. These parts of the magneto are embedded in the rim of the flywheel with the poles 58 in an unvaned boss portion 59 and the faces thereof exposed on the inner surface of this boss. For balancing purposes, the vaned rim has an enlargement 60 diametrically opposite the boss 59.

Mounting the armature of the magneto as described, has the advantage of conserving space. In addition, the rotating impeller vanes cooperate with the imperforate web of the flywheel to provide a very effective housing and shield for the armature. Contrary to first expectations, with the arrangement described, the magneto armature is very effectively shielded against damage by solid objects which might be picked up and thrown about by the revolving cutter blade, and is actually kept entirely free from any accumulation of grass clippings, dirt or the like.

This very desirable result apparently flows from the coaction which obtains between the protective "fence" provided by the rotating impeller blades (which in the preferred embodiment of the invention shown in FIGURE 15, is effective even when the engine is stationary due to the circumferentially overlapping relationship of the vanes) and the positive flow of air into the open top and out through the side of the cup-like housing provided by the combined flywheel and air impeller.

This manner of shielding the magneto parts obviates the need for any enclosure of the impeller such as might be provided by a circular or volute wall depending from the mower deck, which, if present, could be a source of annoyance and damage to the impeller due to stones becoming lodged between it and the rotating impeller blades.

The complete magneto, of course, includes a breaker mechanism, indicated generally by the numeral 61, and which, for convenience of inspection and adjustment, is mounted on the top of the engine under a removable, inverted cup-shaped cover 62. The breaker mechanism is substantially identical to that shown and described in the Lechtenberg et al. Patent No. 2,796,454, and includes a rotating cam on the adjacent upper end of the crankshaft, a cam follower, and mechanism by which these parts coact to periodically open and close the breaker points in proper timed relation to the operation of the engine.

Access to the breaker mechanism, of course, also entails displacement of the cover 35, which is removably mounted on the engine whenever such a cover is used. Where a hood 37 is used (as in FIGURE 13) a suitable access door may be provided in the hood, or the hood may be hingedly mounted to swing to an open position uncovering the engine.

The carburetor, designated generally by the numeral 65, is essentially merely a mixing tube to which gasoline is fed from a gas tank 66 along with air which enters through a conventional air cleaner 67. The carburetor is mounted in the conventional manner by being fastened to a flange 68, formed integrally with the cylinder, and through which the intake port of the engine opens. The muffler 38 has its intake secured in the exhaust port 69 of the engine and, as already described, has its outlet facing downwardly and so located as to extend below the deck of the mower chassis and thus discharge into the space therebelow.

As noted hereinbefore, the rope starter mechanism, indicated generally by the numeral 34, is located in the space between the flywheel air impeller unit and the underside of the engine cover casting 20. It comprises a reel 70 upon which the starter rope 71 is wound, and ratchet means providing a unidirectional driving connection between the reel and the flywheel-air impeller unit. The reel has a pair of upper and lower flanges 72 and 73 between which the rope convolutions are confined, with one end of the rope secured to the reel, as at 74. The two flanges are spaced apart a distance generally corresponding to the diameter of the rope and are connected together in any suitable way, as by tangs 75 on the upper flange extending downwardly through the lower flange and riveted thereover, as shown in FIGURE 9.

The lower flange 73 has a hub 76 extending downwardly therefrom and slidably splined to a hollow shaft 77 which is freely rotatably mounted upon the adjacent portion of the crankshaft. In this manner, the driving element of the starter mechanism, comprising the rope reel, the hub 76, and the hollow shaft 77 are journalled for rotation in unison about the axis of the crankshaft.

Figure 9:
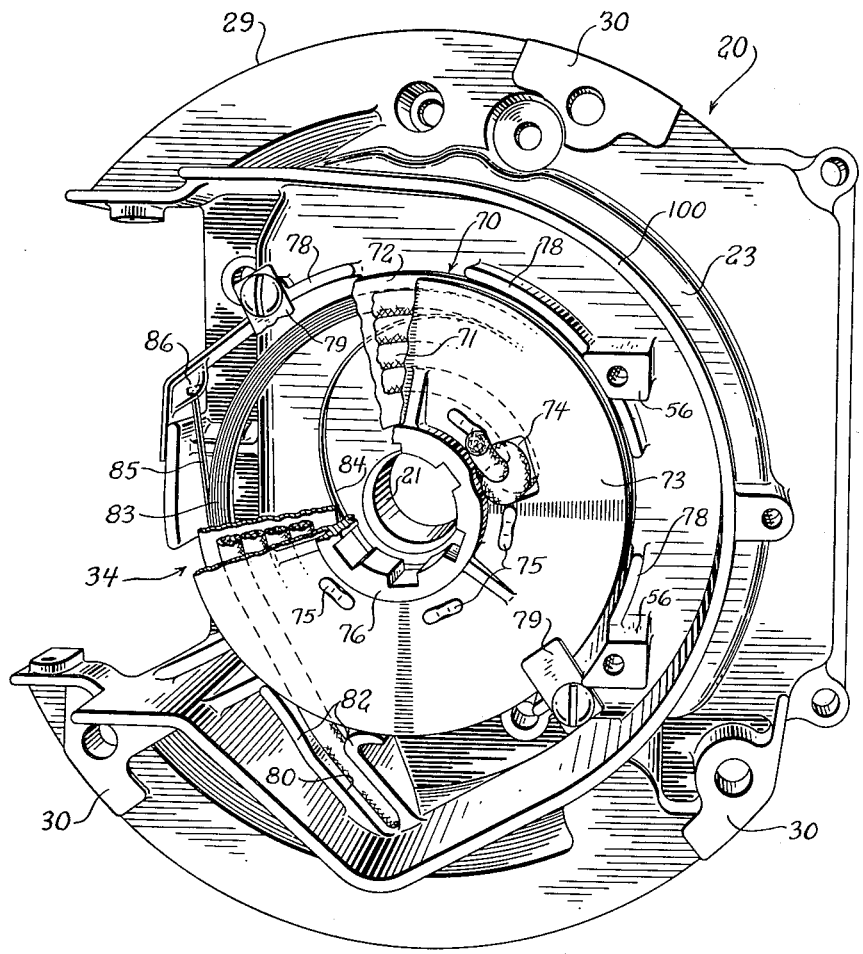
FIGURE 9 is a perspective view of the underside of the cover casting, the top side of which is illustrated in FIGURE 8, this view also showing the rope starter mechanism in place, and having portions thereof broken away and in section.

To assure against displacement of the rope from the reel, the cover casting has a plurality of curved wall portions 78 projecting downwardly from its underside and embracing the rope reel, as best shown in FIGURE 9. Preferably these curved wall portions are integrally connected with the bosses 56 upon which the magneto frame is secured.

A pair of fingers 79, removably secured to the underside of the cover casting, underlie the lower flange 73 to support the rope reel and thus hold the same in position in the cage defined by the curved wall portions 78.

The free end of the rope is slidably received in a rope guiding passageway 80 which leads from a point directly adjacent to the rope reel, to the top side of the engine mounting flange where it terminates in a mouth 81. The passage 80 is formed conjointly by the hole through the mounting flange formed by the mouth 81, and curved downwardly projecting wall portions 82 which also coact with the curved wall portions 78 in defining the rope cage.

A spiral spring 83 in the space between the underside of the cover casting and the rope reel provides the rewind bias for the starter. The inner end 84 of this spring is connected to the reel in any suitable manner, and its outer end 85 is anchored to the cover casting, as at 86.

A handle 87 on the free end of the rope provides the means by which a manual pull may be applied to the starter rope and, of course, also keeps the rope from being pulled down below the mounting flange.

Starting torque applied to the rope reel by a pull on the rope is transmitted to the engine crankshaft through a ratchet mechanism, indicated generally by the numeral 88. This ratchet mechanism is housed in a counterbore 89, formed in the hub 44 of the combined flywheel and air impeller, and comprises a flange 90 on the lower end of the hollow shaft 77 seated in the counterbore 89 and provided with a radial projection 91, a plurality of tangentially disposed cavities 92 in the side wall of the counterbore, and a plurality of balls 92 confined in said cavities to coact with the projection 91 on the flange. The balls 93 are held in their respective cavities by a cover 94 secured to the end of the hub and preferably provided with a dirt seal 95 around its inner edge to keep the ratchet mechanism as clean as possible. Any dirt that passes the seal 95 is expelled from the cavities, during rotation of the flywheel, through radial discharge ports 96 leading from the bottoms of the ball cavities.

In the analogy of the structure described to a conventional pawl and ratchet type of unidirectional drive connection, the balls 93 are the equivalent of the pawl or pawls, the recesses or cavities 92 in the side wall of the counterbore of the hub constitute the pawl anchors, and the radial projection 91 on the flange 90 of the hollow shaft is the equivalent of a single tooth to be engaged by any one of the pawls.

As noted hereinbefore, the rope reel and its associated mechanism is supported by the fingers 79, and since its hub is slidably splined to the hollow shaft 77, it follows that the weight of the reel is not supported by the hollow shaft 77, and because the hollow shaft alone is not very heavy, no special end thrust bearing means is necessary between the hollow shaft and the bottom of the counterbore in which it seats. Also, by virtue of the splined driving connection between the hollow shaft 77 and the hub of the rope reel, inevitable discrepancies in location between these parts encountered during assembly will be accommodated.

The construction and location of the rope starter mechanism has two very important advantages. First, it conserves space since by its described location it is placed in space otherwise wasted and, secondly, it assures against tipping over the mower during the starting of the engine. This follows from the fact that the point at which the starter rope enters the mower structure is close to the bottom thereof rather than at the very top as it is in conventional rotary lawn mower designs. It should also be observed that by having the starter rope come up through the engine mounting flange, the pull applied to the rope to start the engine is in a much more natural direction than in the prior art constructions.

Where the engine is fully covered, as it is in FIGURE 13, the starter rope, of course, should project all the way through the hood 37, as shown.

The air guiding passage, or duct 40 in the specific embodiment of the invention here illustrated, is formed conjointly by a plurality of different parts on the engine. One of these is a substantially horse-shoe shaped wall 100, projecting downwardly from the underside of the cover casting 20 in spaced relation to the rope reel. The closed curved end of this wall has a radius substantially equal to the radius of the inner wall of the vaned rim of the combined flywheel and air impeller, so as to be contiguous thereto. Another of the several engine carried parts which together form the air guiding duct, is a stamped metal shell 101 having a flat annular portion 102 joined to the underside of the wall 100, and an upwardly opening lateral portion 103. A round hole 104 in the flat annular portion 102 of this shell has a diameter substantially equal to the inside diameter of the vaned rim of the flywheel and air impeller, and as shown in FIGURE 5, the edge of this hole is concentric to the crankshaft and lies directly adjacent to the inner edge of the vaned rim. The hole 104 thus provides the actual outlet or discharge mouth of the air guiding duct and because of the contiguity of its edge to the inner edge of the vaned rim, the air drawn into the impeller must first pass through the duct. The duct is completed by a substantially U-shaped shell 105 which embraces the engine cylinder and cylinder head and constrains the air to flow across these engine walls in good heat exchange relation therewith.

It is significant that the structure which defines the air guiding duct 40 is so placed on the engine that the duct passes through the mounting flange 29 of the engine and through the deck of the mower, as hereinbefore described. It is this structural relationship which makes recirculation of the engine cooling air virtually impossible.

The engine is also equipped with the customary governor, which includes a hinged vane 106 mounted in the air guiding duct to respond to changes in the velocity of the air flow through the duct, and suitable linkage connecting this vane to the throttle valve of the carburetor.

In addition, the engine may be equipped with a conventional starting and running control, which includes a control lever 108 conveniently mounted on the cover 35 or hood 37, and linkage connecting it with the choke valve and ignition switch.

What is claimed as my invention is:

1. A rotary power lawn mower comprising the combination of: a wheeled chassis having a substantially horizontal deck; an engine mounted on the deck with its crankshaft vertical and the lower end portion therof thereof projecting down through a hole in the deck; a cutter blade fixed to the lower end portion of the crankshaft; structure fixed with respect to the deck defining an air duct and passing through the deck at a distance out from the engine crankshaft, the deck having a hole to accommodate the duct and the duct having a generally vertical upper section above the deck and a generally horizontal lower section below the deck, the lower section extending from its junction with the upper deck toward and around the downwardly projecting end portion of the crankshaft and having a round discharge mouth at its bottom concentric to the engine crankshaft and through which said downwardly projecting end portion of the crankshaft passes; the upper duct section encompassing the engine cylinder and having an inlet so located that all air moving through the duct must flow over the cylinder; and a centrifugal type air impeller fixed to the downwardly projecting end portion of the engine crankshaft between the cutter blade and the bottom of the duct with the inlet of the impeller contiguous to the discharge mouth of the duct, so that all air entering the impeller must reach the same through the duct.

2. The rotary power lawn mower of claim 1, further characterized by: structure on the chassis forming an engine enclosure above the mower deck and over the engine and the upper section of said air guiding duct, the walls of said enclosure being imperforate except for a screened air inlet in a part thereof through which air may be drawn into the enclosure.

3. The rotary power lawn mower of claim 2, further characterized by sound-deadening means on the imperforate walls of the engine enclosure.

4. An air-cooled internal combustion engine of the type intended to be operated with its crankshaft vertical and with a power takeoff end of the crankshaft projecting downwardly from the bottom wall of the engine crankcase, the engine having a mounting flange projecting outwardly from its crankcase and lying generally in a plane normal to the crankshaft axis, said engine being characterized by: a centrifugal type air impeller fixed to the projecting lower end portion of the crankshaft with the inlet of the air impeller opening towards the bottom wall of the crankcase; and structure on the engine defining an air guiding duct embracing the hot parts of the engine and passing through the mounting flange, said duct having an inlet above the flange and a discharge end portion below the flange surrounding the power takeoff end portion of the crankshaft with its mouth directly contiguous to and coterminous with the inlet of the air impeller so that the impeller can receive air only through the duct.

5. The engine of claim 4 wherein the air impeller has a cup-shaped formation with an imperforate bottom wall and air moving means in its side wall, the cup-shaped air impeller also serving as the flywheel of the engine.

6. The engine of claim 5 wherein the combined air impeller and flywheel has means on its imperforate bottom wall for the attachment thereto of a tool to be driven.

7. The engine of claim 5, further characterized by the fact that the combined flywheel and air impeller carries the permanent magnet of a flywheel-type magneto; and a magneto stator located in the space between the bottom of the engine crankcase and the combined flywheel and air impeller in cooperative relation with the permanent magnet and with a major portion of the magneto stator within the hollow of the cup-shaped air impeller, so that air moving through the impeller flows across said portion of the magneto stator.

8. In an air cooled internal combustion engine having a combined flywheel, magneto rotor and air impeller unit mounted on the crankshaft of the engine, said unit carrying the permanent magnet of the magneto, the engine also having a magneto stator with poles in cooperative relation to the magnet, and structure defining an air guiding duct to direct the flow of air produced by the air impeller over the hot parts of the engine, the improvement which resides in the fact that the combined flywheel, magneto rotor and air impeller is cup-like in shape with the air moving means of the impeller and the permanent magnet in the side wall thereof; and further by the fact that a substantial portion of the magneto stator is located in the hollow of said cup-like unit so that the air moved by the impeller flows over the magneto stator as it passes through the impeller.

9. An air cooled internal combustion engine of the type intended to be operated with its crankshaft vertical and a power takeoff end of the crankshaft projecting downwardly from the bottom wall of the engine crankcase, the engine having a mounting flange projecting outwardly from its crankcase and lying generally in a plane normal to the crankshaft axis, said engine being characterized by: a combined flywheel and centrifugal-type air impeller fixed to the downwardly projecting lower end portion of the crankshaft, said combined flywheel and air impeller being substantially cup-like with an imperforate bottom wall and air-moving means forming part of its side wall, the open top of the cup-like combined flywheel and air impeller which defines the inlet of the impeller, opening towards the bottom wall of the crankcase; a permanent magnet carried by the side wall of the cup-like combined flywheel and air impeller; structure on the engine defining an air guiding duct embracing the hot parts of the engine and passing through the mounting flange, said duct having an inlet above the flange and a discharge end portion below the flange surrounding said power takeoff end portion of the crankshaft with its mouth directly contiguous to and coterminous with the inlet of the air impeller so that the impeller can receive air only through the duct, and so that the discharge end portion of the duct cooperates with the cup-like combined flywheel and air impeller to define a chamber below the bottom of the crankcase; and a magneto for the engine located in said chamber in the path of air moved through said chamber by the air impeller, said magneto having poles in cooperative relation with the permanent magnet; and said disposition of the magneto and the combined flywheel and air impeller, both with respect to the mounting flange, giving the engine a low silhouette when mounted in its position of use.

10. An air-cooled internal combustion engine of the type intended to be operated with its crankshaft vertical and with a power takeoff end of the crankshaft projecting downwardly from the bottom wall of the engine crankcase, said engine having a mounting flange projecting outwardly from its crankcase and lying in a plane generally normal to the crankshaft axis, and having a combined flywheel and air impeller unit carried by its crankshaft which unit also carries permanent magnet means for a magneto, and air guiding means embracing the hot parts of the engine and through which cooling air is moved by the combined flywheel and air impeller unit, said engine being characterized by the following defined location and arrangement of its aforesaid elements whereby the engine is provided with a low silhouette when mounted in its position of use; the combined flywheel and air impeller unit being substantially cup-like with an imperforate bottom wall and the permanent magnet means carried by its side wall, and its open top forming an air inlet; the combined flywheel and air impeller unit being fixed to the downwardly projecting lower end portion of the crankshaft with its air inlet opening toward the bottom wall of the crankcase; the air guiding means passing through the mounting flange and having an air inlet above the flange and a discharge end portion below the flange surrounding the power takeoff end portion of the crankshaft with its mouth contiguous to and coterminous with the inlet of the air impeller so that the air impeller can receive air only from the air guiding means and so that the discharge end portion of the air guiding means cooperates with the cup-like combined flywheel and air impeller unit to define a chamber below the bottom of the crankcase; and the magneto for the engine being located in said chamber with its poles in cooperative relation with the permanent magnet means, said magneto being thus in the path of air moved through said chamber by the air impeller.

References Cited in the file of this patent

UNITED STATES PATENTS

| | | |
|---|---|---|
| 2,557,598 | Daggett | June 19, 1951 |
| 2,791,078 | Keikhaefer | May 7, 1957 |